(12) United States Patent
Fisher et al.

(10) Patent No.: US 11,320,013 B1
(45) Date of Patent: May 3, 2022

(54) BRAKE COOLING SYSTEM AND METHOD OF COOLING BRAKES IN AN AXLE ASSEMBLY

(71) Applicant: TowHaul Corporation, Bozeman, MT (US)

(72) Inventors: Keith Bryon Fisher, Manhattan, MT (US); Fred Wallace Bent, Belgrade, MT (US)

(73) Assignee: TowHaul Corporation, Bozeman, MT (US)

( * ) Notice: Subject to any disclaimer, the term of this patent is extended or adjusted under 35 U.S.C. 154(b) by 41 days.

(21) Appl. No.: 17/071,016

(22) Filed: Oct. 15, 2020

(51) Int. Cl.
| F16D 65/853 | (2006.01) |
| F16D 55/40  | (2006.01) |
| F16D 65/78  | (2006.01) |
| F16D 66/00  | (2006.01) |
| F16D 121/02 | (2012.01) |

(52) U.S. Cl.
CPC ........... F16D 65/853 (2013.01); F16D 55/40 (2013.01); *F16D 2065/783* (2013.01); *F16D 2065/787* (2013.01); *F16D 2066/001* (2013.01); *F16D 2121/02* (2013.01)

(58) Field of Classification Search
CPC .. F16D 55/40; F16D 65/853; F16D 2065/783; F16D 2065/787; F16D 2066/001; F16D 2121/02
See application file for complete search history.

(56) References Cited

U.S. PATENT DOCUMENTS

| 3,949,844  | A  | * | 4/1976  | Larson     | F16D 65/853 |
|            |    |   |         |            | 188/264 P   |
| 4,083,469  | A  | * | 4/1978  | Schexnayder| E02F 3/6481 |
|            |    |   |         |            | 188/264 P   |
| 6,030,314  | A  | * | 2/2000  | Brooks     | B60T 5/00   |
|            |    |   |         |            | 303/191     |
| 6,113,338  | A  |   | 9/2000  | Smith      |             |
| 6,135,065  | A  | * | 10/2000 | Weathers   | F01P 3/20   |
|            |    |   |         |            | 123/41.31   |
| 7,036,640  | B2 |   | 5/2006  | Spielman   |             |
| 7,845,471  | B2 | * | 12/2010 | Bares      | F16D 65/853 |
|            |    |   |         |            | 184/6.22    |
| 10,428,923 | B2 | * | 10/2019 | Spielman   | F16H 57/0412|
| 2009/0050412| A1| * | 2/2009  | Bares      | B60B 35/16  |
|            |    |   |         |            | 184/22      |

* cited by examiner

*Primary Examiner* — Thomas W Irvin
(74) *Attorney, Agent, or Firm* — Clark & Brody LP

(57) ABSTRACT

A brake cooling system uses a pair of subsystems to efficiently provide brake cooling and operation of the system. A first subsystem uses an axle assembly to drive one or more pumps to drive a variable speed cooling flow pump motor and a variable speed fan motor. A second subsystem includes one or more cooling flow pumps that are driven by variable speed cooling flow pump motor to supply a cooling fluid to an air-fluid heat exchanger for cooling and then supply the cooled fluid from the heat exchanger to brakes of the axle assembly. The variable speed fan motor drives a fan for the air-fluid heat exchanger for cooling of fluid passing therethrough. The system also includes a means for controlling the speed of the motors to regulate the heat exchanger operation and cooling flow through the heat exchanger and brakes of the axle assembly.

14 Claims, 3 Drawing Sheets

BRAKE COOLING SYSTEM AND METHOD OF COOLING BRAKES IN AN AXLE ASSEMBLY

FIELD OF THE INVENTION

The present invention is directed to an improved brake cooling system, and, in particular, to a system that uses a transmission of a vehicle axle assembly to drive the cooling system and parallel circuits or subsystems, one for brake cooling and one for driving components used for brake cooling.

BACKGROUND ART

In heavy duty mining or construction machinery, a number of different types of brake cooling systems for brakes in a vehicle axle assembly are often utilized. Some systems use the engine or power unit of the vehicle for brake cooling whereas others may use air to oil coolers or circulate a cooler fluid through the oil at the axle assembly itself.

Another need for brake cooling systems is found in trailers designed to haul heavy duty mining equipment such as shovels and mine haulage trailers, e.g., bottom dump trailers, and the like. FIG. 1 shows a typical lowboy trailer 90 having a trailer bed 91 for supporting heavy machinery 92, a gooseneck 93, a hauling vehicle 95, trailer wheels 97 (one shown), and a trailer axle assembly represented by numeral 99. The assembly 99 includes an axle with brakes (both not shown) for trailer operation, wherein the brakes are controlled by the operator in the hauling vehicle 95 that attaches to the trailer via the gooseneck 93. See also U.S. Pat. No. 6,113,338 to Smith (incorporated in its entirety herein).

One problem that has arisen for cooling trailer brakes is caused by the increase use of a removable gooseneck hitch for the trailers, as disclosed in U.S. Pat. No. 5,435,586 to Smith, also incorporated in its entirety by reference, and depicted in FIG. 1. These types of hitches permit the trailer size to increase, thus allowing for heavier trailer loads. However, because of the increased loading, substantially higher braking requirements are imposed on the trailer brakes, and existing braking cooling systems are ill-equipped for such demands. Secondly, the use of trailers that rely on connection to a gooseneck hitch as disclosed in the '586 Smith patent creates problems when relying on the power unit of the vehicle hauling the trailer for trailer brake cooling. The connection between the hauling vehicle and cooling system must be made every time the trailer is hooked to the hitch, and larger hoses, couplings, etc. are required due to the increased braking requirements of the trailer.

In light of the problems noted above, a need existed to develop better brake cooling systems. While one solution would be to install a separate engine on the trailer itself for brake cooling, but such an engine requires fuel, oil, and maintenance. In addition, failure of the engine could compromise the braking ability of the trailer axles, and create a potentially dangerous situation if trailer braking is lost.

An improved brake cooling system is disclosed in U.S. Pat. No. 7,036,640 to Spielman. This system is one that provides cooling for the wet brakes on a large trailer that has no power system of its own, so that the trailer can assist in retarding the motion of the load during extended periods of braking requirements—such as when descending along a steep slope. The basic elements for such a brake cooling system are:

a) an axle, or axles, that can transfer motion from the unpowered wheels to a transmission/pump assembly, and wheel hubs on said axle(s) that have wet brakes for retarding the motion of the load;

b) a pump assembly that can receive ground driven power from the wheels, via a transmission, to move fluid through the wet brake housings to cool them;

c) an air-to-oil (or other fluid-to-oil) heat exchanger (cooler) to remove heat from the cooling oil;

d) appropriate fluid conditioning for containment (reservoirs) and cleaning (filters) of the brake cooling oil;

e) a drive for the fan of the heat exchanger (assuming it utilizes an air-to-oil type heat exchanger);

f) a transmission (hydraulic or other) suitable for efficient transfer and control of power from the axle to the cooling flow pump(s) and the fan (if so equipped); and g) a means of controlling the cooling flow, and speed and power of a fan (if so equipped), in order to maintain optimal cooling, when required within the functional limitations of all components and with respect to the variability of the ground drive input speed.

The prior art system utilized multiple pumps to provide cooling flow to each wheel brake chamber. When the ground speed was low and there was a demand for cooling due to elevated brake chamber temperature, flow was routed from each pump to each brake housing. However, as the ground speed increased, the increased flow had to be sequentially diverted via valves directly back to the reservoir. This diversion was a result of the inability of the cooler and brake chamber to handle the entire increased flow as a result of the increased speed of the trailer and increased pump output. This step-wise control resulted in difficulty in maintaining an optimal cooling flow for any given input speed and essentially an inability to base the controlled flow on the most limiting parameters, one being pressure drop across the brake chambers and cooler assembly or heat exchanger.

The prior art system also utilized multiple pumps for the fan drive, and both on-off valve flow diversion and proportional valve flow diversion control to provide as much air flow through the heat exchanger as possible without over-speeding the fan. This flow diversion method of limiting high pressure hydraulic flow created significant amounts of heat on its own which further limited the ability of the entire system's overall heat rejection, and the on-off portion of the control results in less-than-optimal operational capability. The overall capability of the cooling system and its efficiency suffered due to the means of power transmission and its control.

Other drawbacks in the brake cooling system described above include an excessively complex control system, for example 34 electrical input/outputs and 25 hydraulic hoses. The prior art brake cooling system also had a relatively poor cooling capacity in that it could lose more than 50 HP of cooling at 1000 rpm. The large number of components in a given area made the design difficult to maintain and a close control of the system due to the bypass feature of the system was difficult to obtain.

However, even the improved brake cooling system described above had its drawbacks in terms of cooling efficiency and simplicity of the overall system. As such, a need exists to provide an improved brake cooling system.

The present invention overcomes the drawbacks noted above by the creation of a system, among other things, that eliminates the problem of dirty oil in more sensitive drive components, and provides a higher efficiency in terms of cooling and vehicle performance.

SUMMARY OF THE INVENTION

It is a first object of the present invention to provide an improved brake cooling system. Another object of the invention is to provide a brake cooling system that is self-reliant and does not rely on a hauling vehicle cooling system, or a separate trailer-mounted engine driven cooling system.

The invention is particularly adapted for use in trailers that use axle assemblies for support of the rear of the trailer, and require braking assemblies for the rear wheels of the trailer. Preferred trailers are lowboy trailers that use a gooseneck hitch to lift a front end of the trailer for trailer movement.

In one embodiment, the inventive brake cooling system for brakes in an axle assembly includes a first subsystem for cooling the brakes using a cooling fluid and subjecting the cooling fluid to heat exchange once it is used to cool the brakes and a second subsystem using the axle assembly to provide power for brake cooling and for heat exchange.

The first subsystem constitutes a cooling fluid circuit that has a number of components as follows. A cooling fluid reservoir and at least one cooling flow pump arranged downstream of an outlet of the reservoir are provided. Optionally, at least one filter could be arranged downstream of the at least one cooling pump for filtering cooling fluid from the outlet of the at least one cooling flow pump.

An air-fluid heat exchanger is arranged downstream of an outlet of the filter. The air-fluid heat exchanger includes a fan to cool cooling fluid passing through the heat exchanger. An outlet of the heat exchanger is configured to provide cooled fluid to one or more brake chambers of the axle assembly. The fluid exiting the brake chambers, now heated, is directed to an inlet of the cooling fluid reservoir. The fluid in the reservoir is then cycled through the heat exchanger for continued brake chamber cooling.

The second subsystem including a circuit that powers the fan and the cooling flow pumps of the first subsystem. This circuit includes at least one transmission pump coupled to the axle assembly. The rotation of the axle of the axle assembly drives the at least one transmission pump and the transmission pump pumps a fluid through the cooling fluid powering circuit. The fluid being pumped by the transmission pump is directed to a a variable speed cooling flow pump motor arranged downstream of the at least one transmission pump, the variable speed cooling flow pump motor powered by the outlet flow from the at least transmission pump and designed to drive the at least one cooling fluid pump. The at least one transmission pump also provides a fluid to drive a variable speed fan motor arranged downstream of the at least one transmission pump, the variable speed fan motor powered by the outlet flow from the at least one transmission pump and designed to drive the fan of the heat exchanger. A transmission reservoir is provided arranged downstream of the variable speed cooling flow pump and fan motors.

Optionally, at least one filter is arranged upstream of the transmission reservoir to filter output from the variable speed cooling flow pump and fan motors. Outlet flow from the variable speed cooling flow pump and fan motors is directed back to the at least one transmission pump via the transmission reservoir and filters, if used, to continually power the variable speed cooling flow pump and fan motors.

The system also includes means for controlling the speed of the variable speed cooling flow pump and fan motors based on at least temperature of the brakes and one or more of fan fluid pressure, fan fluid temperature, fan speed, and pressure at an inlet to the brakes and at the inlet of the heat exchanger. This control means allows for changing of the speed of the variable speed cooling flow pump motor so as to alter the flow of cooling fluid through the heat exchanger and brakes for brake cooling control. The control also allows for altering the speed of the variable speed fan motor allowing for control of heat exchange with the cooling fluid.

While the embodiment above describes one transmission pump, a pair of transmission pumps could be employed, one transmission pump driving the variable speed cooling flow pump motor and the other transmission pump driving the variable speed fan motor. With the use of a pair of transmission pumps, a pair of filters can be used to filter the fluid being pumped by each transmission pump.

In addition, while one cooling flow pump is disclosed to move the cooling fluid through the heat exchanger for brake cooling, two cooling flow pumps can be provided. In this embodiment, one cooling flow pump is configured for cooling one of the brakes of the axle assembly and the other cooling flow pump is configured for cooling the other of the brakes of the axle assembly. When a pair of cooling flow pumps are used, a filter can be used downstream of each cooling flow pump (pressure side) to provide clean cooling fluid directed to the heat exchanger and brake chambers.

The control means can include a first controller for control of the variable speed cooling flow pump motor and a second controller for control of the variable speed fan motor. The first controller can receive input as brake temperature and brake and heat exchanger inlet pressures for control of the variable speed cooling flow pump motor. The second controller can receive input as fan fluid temperature, fan speed, and fan fluid pressure for control of the variable speed fan motor.

The invention also includes a method of cooling brakes in an axle assembly, wherein the inventive brake cooling system is used with the axle assembly.

A further aspect of the invention is the combination of the inventive brake cooling system with a trailer having an axle assembly supporting rear wheels thereof, the axle assembly including brakes for the wheels. While the trailer can be any type, a preferred type is a lowboy trailer having a front-end hitch capable of connecting to a removable gooseneck hitch of a towing vehicle.

Another aspect of the invention is the combination of the braking cooling assembly with an axle assembly of any kind of a vehicle, wherein brake or brakes of the axle assembly require cooling.

Another aspect of the invention relates to an axle assembly having brakes that require cooling, wherein at least one cooling flow pump that supplies cooling fluid to the brakes and means for driving of the cooling flow pump using rotation of a component of the axle assembly and a variable speed cooling flow pump motor, and a heat exchanger adapted to receive heated fluid from the brakes for cooling and recirculation back to the brakes are provided. The heat exchanger can include a fan and a means for driving the fan using rotation of a component of the axle assembly and a variable speed fan motor.

BRIEF DESCRIPTION OF THE DRAWINGS

Reference is now made to the drawings of the invention wherein.

DETAILED DESCRIPTION OF THE INVENTION

The present invention offers significant advantages in the field of heavy machinery that requires extensive braking due to the movement of heavy loads. Instead of using a system such as described in U.S. Pat. No. 7,036,640, an improved system is utilized to accomplish this same end goal, i.e., brake cooling. The redesign differs from the prior art design in its means of transferring power to the cooling pumps and fan, and in its means of controlling the cooling flows and the fan speed, with the intent of optimizing the cooling capability of the inventive system. In one mode, the redesign employs a continuously variable speed motor to drive cooling flow pumps, and a continuously variable speed motor to drive the fan as described in more detail below.

More particularly, the redesigned system transfers power to variable speed motors that drive cooling flow pumps and a fan, through transmission pumps that are direct driven from the wheel/axle motion. It should be understood that although the power transfer to the cooling flow pumps and the fan could be accomplished with other means such as electrical generators and motors. The speed of the variable motor, which drives the cooling flow pump is controlled, with temperature and pressure information taken from the system, to provide the maximum amount of cooling flow that can be safely put through the cooler and brake chambers, thus optimizing the cooling capacity irrespective of ground speed and cooling oil viscosity. The speed of the variable fan drive motor can also be controlled, with temperature, speed, and pressure information taken from the system, to provide optimal fan speed/air flow through the heat exchanger without the gross inefficiency of diverting pressurized fluid from the fan drive. The redesigned system is significantly more efficient, can provide optimized cooling for nearly any input condition, and is less complex than the prior system.

Figure 2:
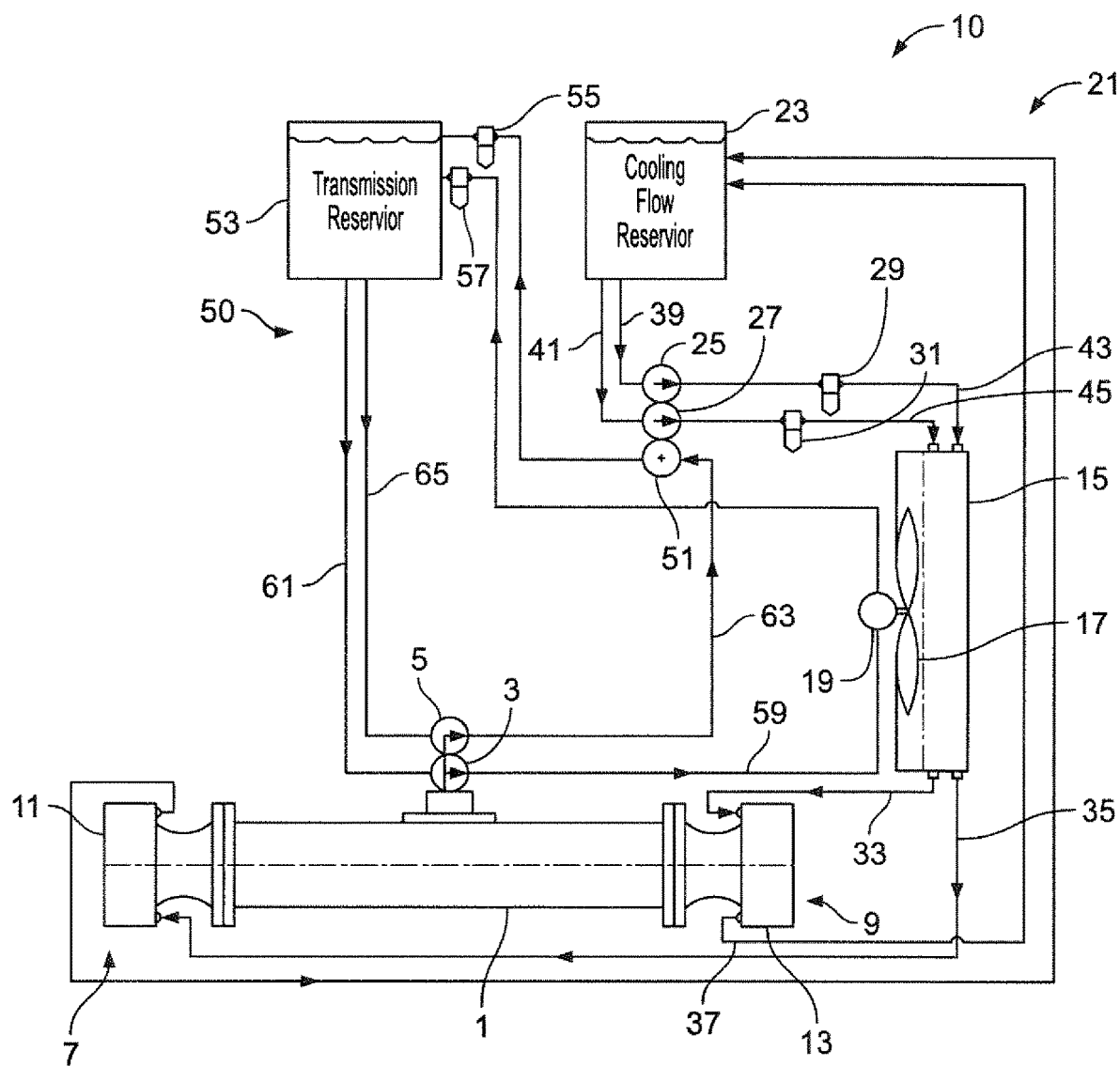
FIG. 2 is a schematic drawing of one embodiment of the invention.

Referring now to FIG. 2, one embodiment of the inventive system is designated by the reference numeral 10. The system as shown is adapted for cooling of the brakes found in a Caterpillar 785 axle assembly 1. This kind of axle assembly is only exemplary and others could be used as well. Notably, there is no need for a clutch in the inventive system as is present in the prior art brake cooling system described above. While not shown, the axle/transmission assembly would be mounted on a trailer and would support trailer tires.

The axle assembly includes left and right wheel ends 7 and 9, each end 7 and 9 also having a respective brake chamber 11 and 13, each brake chamber housing brakes in need of cooling during use of the trailer or other vehicle using the brake cooling system.

The system 10 includes a heat exchanger designated by the reference numeral 15. The heat exchanger 15 provides a cooling effect to the oil that is used to cool the brakes in the brake chambers 11 and 13.

In FIG. 2, the heat exchanger 15 is shown using air cooling by means of a fan 17. The fan 17 is driven by a hydraulic variable speed fan drive motor 19.

The heat exchanger 15 is part of a first circuit or subsystem 21 of the system 10, wherein cooling oil is introduced to the heat exchanger 15 for cooling and then directed to the brake chambers 11 and 13 for brake cooling. The heated oil exiting the brake chambers is then returned to the heat exchanger 15 for cooling again using components of the subsystem 21.

More particularly, the components of the subsystem 21 include the heat exchanger 15 and the fan 17. Additional components include a cooling flow reservoir 23, a pair of cooling flow pumps 25 and 27, and filters 29 and 31, each filter 29 and 31 downstream of the outlet of the cooling flow pumps 25 and 27 and upstream of the heat exchanger 15. Thus, downstream filtration is provided and clean oil is directed through the heat exchanger 15 and brake chambers 11 and 13. However, the filtration could also be employed upstream of the cooling flow pumps 25 and 27, if so desired, or no filters could be used as well. Filtering is preferred when cooling brakes of the type of the exemplified axle assembly as filtering the cooling oil before it goes into the heat exchanger and brake chambers helps keep the brake residue from silting and plugging these components. When filters are used, it is preferred that they are not used directly before the inlet of the pumps because of the fact that the system is sometimes used in very cold weather and this kind of filter arrangement can lead to cavitation of the pumps.

In operation, the cooled oil from the heat exchanger outlet 33 is directed to the right wheel brake chamber 13 for brake cooling. Similarly, the cooled oil from the heat exchanger outlet 35 is directed to the left wheel brake chamber 11 for brake cooling.

The cooling oil from heat exchanger outlet 33, now heated as a result of brake cooling, exits the brake chamber 9 at 37 and is returned to the cooling reservoir 23. Similarly, the cooling oil from heat exchanger outlet 35, now heated as a result of brake cooling, exits the brake chamber 11 at 39 and is returned to the cooling reservoir 23.

The cooling oil in the reservoir 23 is then withdrawn by the pumping action of the pumps 25 and 27 via reservoir outlet lines 39 and 41. The heated oil from the pumps 25 and 27 is then filtered at filters 29 and 31 and returned to the heat exchanger via lines 43 and 45.

The second subsystem or circuit of the system 10 is designated by the reference numeral 50. This subsystem provides the means to drive the cooling flow pumps 25 and 27 for brake cooling and the fan 17 of the heat exchanger 15 for oil cooling. The subsystem 50 includes the hydraulic pumps 3 and 5, the variable speed fan drive motor 19, and another variable speed cooling flow pump drive motor 51 that drives the cooling flow pumps 25 and 27. While one motor 51 is shown, two motors could be used, one for each pump 25 and 27. The subsystem 50 also includes a transmission reservoir 53, and filters 55 and 57. One circuit of the subsystem 51 has the hydraulic pump 3 driving the variable speed fan motor 19 by the hydraulic pump directing oil to the fan motor 19 via line 59. The outlet of the fan motor 19 is filtered by filter 57, and the filtered oil enters the transmission reservoir 53. The oil from the transmission reservoir 53 is then directed back to the hydraulic pump 3 via line 61.

In a similar fashion, a second circuit of subsystem 50 is provided that drives the cooling flow pumps 25 and 27. In this circuit, the outlet of the hydraulic pump 5 via line 63 drives the variable speed cooling flow pump motor 51. The outlet from the motor 51 is filtered by filter 55 and directed to the transmission reservoir 53. The outlet of the transmission reservoir 53 is then directed back to the hydraulic pump 5 via line 65.

As with the first subsystem 21, the filtration of the subsystem 50 is optional. Also, while the subsystem 50 has the filters 55 and 57 in the return to the pumps 3 and 5, the pressure filtration used in the subsystem 21 could also be employed for the pumps 3 and 5. Moreover, the preferences described for the subsystem 21 could be applied to the subsystem 50, if so desired.

The variable speed motors 19 and 51 for the cooling flow pumps and fan, respectively, can be any known type of variable speed motors, wherein the output speed of the motor can be controlled. In the types of motors described herein, maximum displacement results in a low speed and reducing the displacement to a minimum causes the motor output speed to increase to its rated maximum. Examples of the speeds and flows for these motors are detailed below in connection with a description of the operation of the brake cooling system.

With the two subsystems 21 and 50, a system is provided that has a clean side (subsystem 50) and a dirty side (subsystem 21). As the oil that is used for brake cooling gets extremely dirty, this dirty oil is only used in the circuit for the heat exchanger 15. The other circuit that drives the cooling flow pumps and fan uses oil that remains relatively clean as this oil is separate from that used for brake cooling.

Figure 3:
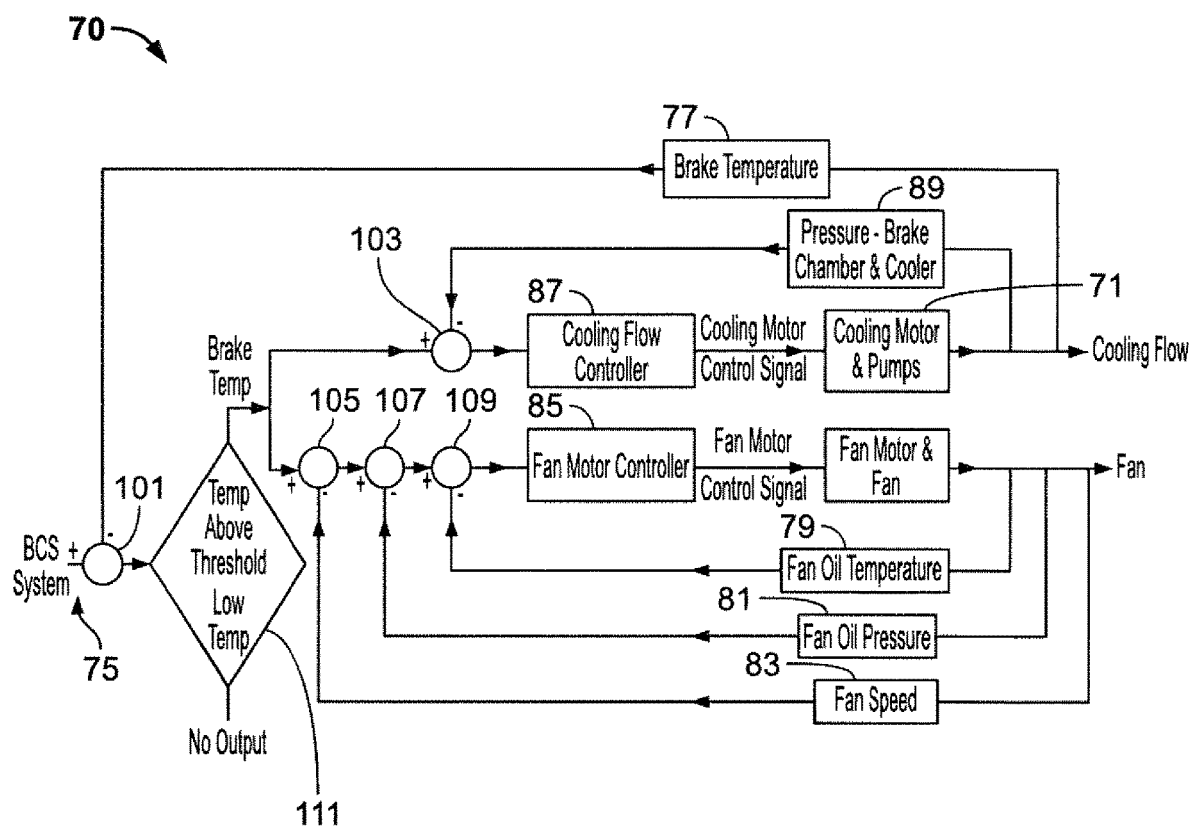
FIG. 3 shows a schematic drawing of the control features of the system of FIG. 2.

FIG. 3 shows a control scheme for operating the system 10 of FIG. 2 that is designated by the reference numeral 70. In this figure, the motor and cooling flow pumps are designated by the reference numeral 71 and the fan drive motor and fan are designated by the reference numeral 73. The control scheme includes a number of sensors that monitor pressure, temperature, speed for the various components of the system so that the fan 17 is operated properly in connection with the heat exchanger and the cooling flow pumps are operated properly to obtain the necessary brake cooling, when needed.

More particularly, the brake cooling control system is in communication with the oil in the brake chambers. A brake temperature sensor 77 is provided that monitors the temperature of the brakes. If the brake temperature is at or over a threshold, the brake cooling become operative with the hydraulic pumps 3 and 5 driving the fan drive motor 19 and cooling flow pumps 25 and 27 so that cooling oil can be cooled by the heat exchanger 21 and the cooling oil can move through the circuit for brake cooling.

For operation of the fan motor, the outlet of the fan drive motor is monitored for fan oil temperature at 79, fan oil pressure at 81, and the fan speed is monitored at 83. The parameters are fed to the fan motor controller 85 and the controller 85 controls the speed of the fan 17 for heat exchange.

A cooling flow controller 87 is provided that controls the cooling flow pump motor 51 that drives the cooling flow pumps 25 and 27. Pressure sensor 89 represents monitoring of the pressure at the inlet of the brake chambers and heat exchanger and the cooling flow controller 87 uses these pressures to control the flow to the cooling flow motor 51 and cooling flow pumps 25 and 27.

A more detailed description of the control system of FIG. 3 and the subsystems 21 and 50 of FIG. 2 is now described in terms of four stages. For the sake of this description, it is assumed that a trailer is equipped with the inventive brake cooling system. The trailer is loaded to rated capacity and is beginning the descent of a significant slope, and the prime mover operator has engaged the trailer brake retarding function in an effort to provide braking assistance to the prime mover hauling the trailer. Also, it is assumed that the vehicle enters the descent at a relatively low speed, for example, in first or second gear. It should be understood that the various flows, pressures, and other variables described in the four stages are only exemplary of the system operation and other values could be employed depending on the particulars of the brake cooling system and its component parts.

In the first stage, the brake chamber temperatures are assumed to be below a lower limit temperature ($T_{LL}$) at which the system controllers 85 and 87 are set to initiate the cooling functions. While the temperature is below this threshold, the pumps 3 and 5 connected to the axle 1 are pumping small amounts of oil, for example 18 gallons per minute (gpm) for circulation through the brakes and 20 gpm for the fan drive. The oil being pumped goes respectively to the variable displacement fan motor 19 and variable displacement cooling drive motor 51. Because the temperature is still below the threshold $T_{LL}$, both of these motors are at maximum displacement which corresponds to their slowest output speed. The fan drive 19 would be idling at a little over 300 rpm, for example, which requires a negligible amount of power. Similarly, the cooling flow pumps 25 and 27 will be spun at close to 300 rpm thus pumping about 16 gpm each, such flow going through the heat exchanger and brake chambers with very little resistance.

In the second stage, wherein it is assumed that the initiation of braking has resulted in a rise of brake chamber temperatures to the lower limit ($T_{LL}$) or above, the system controllers 85 and 87 are set to initiate the cooling function. Once the brake chamber temperature limit is met or exceeded, the controllers 85 and 87 will gradually begin to reduce the displacement of the two variable speed motors, such reduction in displacement resulting in an increase in the speed of each motor 19 and 51. This speed increase will speed up the fan and increase the cooling flow via increased speed of the pumps 25 and 27.

By the time that the brake chamber temperature has risen to $T_{LL}$ plus a small amount (10° F. for example), which is called a minimum full-on cooling temperature, designated as $T_{MFC}$. In this state, the motors 19 and 52 have decreased to minimum, or nearly minimum, displacement, and the fan will be at a nominal rated speed of 1500 rpm, and the cooling flow will be at 75 to 80 gpm. If the fan oil pressure begins to rise above the upper limit pressure ($P_{PL}$) (say 2500 psi), then the controller 85 will slightly increase the displacement of the fan drive motor 19 so the pressure does not exceed its upper limit. Also, if the pressure drop across the brake chambers nears its limiting inlet brake chamber pressure ($P_{BCL}$), then the displacement of the pump drive motor 51 will also increase slightly to reduce the flow so the pressure drop remains below its upper limit. For example, the brake chamber has a pressure limit, for example, about 25 psi, which is based mostly on the seals. If too much oil (or oil of too high of a viscosity) is pushed through the chambers, then the allowed pressure will be exceeded and a need to reduce the pressure is required. Similarly, the heat exchanger also has a pressure limit, for example, 150 psi, which is also flow limiting so that pressure through the heat exchanger needs to be controlled as well.

Now, if the temperature should begin to drop below $T_{MFC}$, the displacements of the motors 19 and 51 would be gradually increased so that the variable speed fan and cooling flow pump motors begin to slow and fan speed and cooling flow begins to slow.

In the third stage, it is assumed that the brake temperatures stay high or increase. If the brake temperature is still high so that the cooling is full on, and if the vehicle speed increases, the pumps 3 and 5 connected to the axle 1 will pump proportionately more oil to the motors 19 and 51. For example, a 30% speed increase will result in approximately 30% more flow (up to 23.4 gpm and 26 gpm for cooling flow pump motor and fan motor, respectively). The higher flows from the pumps 3 and 5 connected to the axle would cause the fan 17 to overspeed and possibly send more oil from the cooling flow pumps 25 and 27 through the heat exchanger 15 and brake chambers than they are designed to handle. However, any very slight increase in fan speed will be used by the controller 85 to slightly increase the displacement of the fan motor 19 so as to lower fan speed. Also, if the pressures at the inlets to the brake chambers $P_{BCL}$, and the heat exchanger begin to approach their limits, then the displacement of the cooling drive motor 51 will increase to lower the pressure and flow through the heat exchanger and brakes. In this way (controlling the motor displacements), the fan speed can be maintained at a high, but safe, speed without diverting any pressurized oil (which generates additional heat and wastes power), and the flow through the cooler and brake chambers can be maintained at the highest safe (based on pressure) flow possible, again without diverting any oil. The fan oil temperature is also monitored at 79. If the fan oil temperature rises above the motor's safe temperature limit, the controller 85 would reduce the fan speed (power) by increasing motor displacement.

As the brake chamber oil becomes hotter, the viscosity decreases and the pressure drops through the heat exchanger and brake chamber diminish for a given flow, thus more flow can be can safely be put through the brake chambers at higher temperatures—improving the cooling capacity. Overall, the control of flows and speed with displacement is more precise than the diversion of flow methodology of the prior art system would afford. That is, with the inventive system, the rate of cooling flow can be optimized, which increases cooling capacity, and the inefficiencies found in the prior art system are greatly reduced.

All changes (increases or decreases) in vehicle speed result in similar control adjustments to the motor displacements to maintain safe and optimized operation. The upper limit of the vehicle speed corresponds to the upper limit of the rated speeds for the pumps 3 and 5 and the fan 17 when its drive motor 19 is operated at its maximum. Both of these speeds are monitored and warnings are given if the speeds become too high.

At some point, the need for brake retarding will no longer be required and the cooling system transitions to the fourth stage. In this stage, the controllers 85 and 87 will continue the cooling functions as long as the vehicle is moving and the brake chamber temperature is above the minimum full-on cooling temperature ($T_{MFC}$). Once the brake chamber temperature drops below this limit, the speed of the cooling flow pumps 25 and 27 and fan 17 are gradually decreased until the lower limit temperature ($T_{LL}$) is reached at which the cooling function ceases.

Still referring to FIG. 3, this diagram also uses summing nodes 101, 103, 105, 107, and 109 as part of the control system and the feedback loops thereof. When the system is operational, the system is always monitoring the temperature of the brakes. The temperature has to reach the cooling requirement threshold in order for it to be sent to the control. This is represented by the decision block or diamond 111. The summing node 101 constantly receives the sensed temperature of the brakes and feeds that information to the decision block. Once the brake temperature reaches the threshold, the decision block allows the brake temperature signal to be sent to the controllers 85 and 87. This signal also passes through additional summing blocks 103, 105, 107, and 109. These additional summing blocks add feedback from the brake chamber and heat exchanger and fan oil pressure, fan speed, and fan oil temperature. The information to each controller is a combination of brake temperature and the other measured parameters, whether it be brake and heat exchanger pressures for the cooling flow pump motor 51 and associated pumps 25 and 27 via the controller 87 or fan speed, fan oil temperature, and fan oil pressure for the fan motor 19 via the controller 85 for control of the system hardware. While a pair of controllers are shown for each circuit, one controller with dual controlling capability could be used as well. Likewise, while one motor 51 is used to drive both pumps 25 and 27, a pair of motors could be used as well.

Besides providing an improved brake cooling system for use with an axle assembly, the invention also entails a method of cooling brakes of an axle assembly using the inventive brake cooling system.

The inventive brake cooling system is particularly adapted for use on one or more axle assemblies of a trailer that is designed to haul heavy equipment, e.g., a low boy trailer, since these trailers can require significant amounts of brake cooling on the trailer brakes. However, any axle assembly that would have one or more brakes that require cooling would be a candidate to use the inventive brake cooling system.

As mentioned above, the inventive brake cooling system offers a number of advantages over the prior art brake cooling system. While some of the advantages of the system have been discussed above, the following provides a more complete description of the advantages for better understanding of the inventive brake cooling system.

With the inventive brake cooling system, the system is simplified for easier assembly and improved reliability, the cooling capacity is improved, costs are reduced, and the overall performance is improved for better customer satisfaction.

In terms of complexity, 12 less electrical I/O are used (22 vs 34 in the prior art system and 12 fewer hydraulic hoses are used (25 vs 37 in the prior art system.

When paired with electrical and hydraulic components, the inventive system eliminates the current tank and filter of the prior art electro-hydraulic brake application system and will allow the inventive system to charge the brake accumulator—reducing cycling on the pump. When the inventive system is paired with air brake actuation, it eliminates booster reservoirs.

Given the simpler nature of the inventive system, access to components for service will be better, and wiring is easier to follow and troubleshoot. With the inventive system, no clutch and gearbox are needed (and a considerably smaller package is used that does not need cross mounts.) Using a 1:1 drive axle will allow the maximum allowable vehicle speed to be 25% higher than obtainable in the prior art system.

By providing two redesigned hydraulic reservoir(s) (one clean for the motor operation, and one for brake cooling), the reservoirs can be more easily serviced. The simpler design also reduces the number of electrical control boxes and greatly improves the efficiency and optimization of the cooling capacity.

Efficiency gains of at least 20% greater at typical (second gear) speeds are expected.

Considerable additional cooling performance is possible by using pressure drop (along with temperature, speeds, and flow) to get extra cooling capacity if temperatures continue to rise and a continual need exists for cooler brake chamber.

While the subsystem 50 shows the use of a pair of transmission pumps to separately drive the cooling flow pump motor 51 and fan motor 19, one transmission pump could be used to drive the motors 19 and 51 and return the oil to the transmission reservoir for recycling. The output of each motor 19 and 51 could be merged for filtering or separately filtered prior to return to the reservoir.

Likewise, while two cooling flow pumps 25 and 27 are used, a single pump and single filter could be used and the outlet of the heat exchanger could be split for both brake chambers. The outlets of the brake chambers could then merge into a single line into the cooling flow reservoir 23.

While an oil typically used for wet brakes is exemplified as the fluid used in the subsystems 21 and 50, any fluid capable of cooling the brakes and powering the motors 19 and 51 could be used as part of the inventive system.

Figure 1:
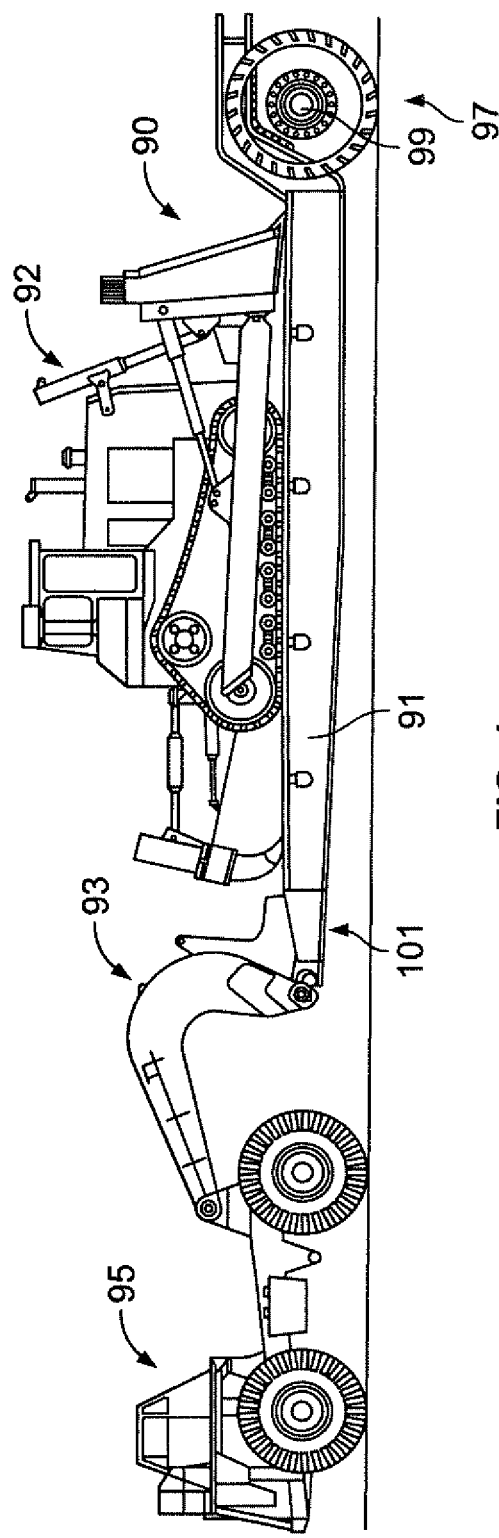
FIG. 1 shows a typical prior art trailer that includes a braking system.

While the inventive brake cooling system is described above for a particular kind of axle, the brake cooling system could be used in any vehicle that had an axle assembly that would provide the necessary rotation to drive the transmission pumps 3 and 5 and require brake cooling. Ideally, the axle assembly is the kind used in the trailer of FIG. 1 but other applications are within the scope of the invention.

In another embodiment, the fan could be powered by an electric motor so that transmission pump would only service the variable speed cooling flow pump motor. In the alternative, the cooling flow pump motor could be powered electrically and the fan motor driven by the transmission pump.

While the axle assembly is shown with a pair of brake chambers, the inventive brake cooling system could be used for brake cooling of an axle assembly that only used one brake chamber for braking.

As such, an invention has been disclosed in terms of preferred embodiments thereof which fulfills each and every one of the objects of the present invention as set forth above and provides a new and improved brake cooling system and method of cooling brakes.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A brake cooling system for brakes in an axle assembly comprising:
   a) a first subsystem for cooling the brakes using a cooling fluid and subjecting the cooling fluid to heat exchange once it is used to cool the brakes; and
   b) a second subsystem using the axle assembly to provide power for brake cooling and for heat exchange;
   the first subsystem comprising a cooling fluid circuit including:
   ai) a cooling fluid reservoir;
   aii) at least one cooling flow pump arranged downstream of an outlet of the reservoir,
   aiii) optionally, at least one filter arranged downstream of the at least one cooling pump for filtering cooling fluid outlet from the at least one cooling flow pump;
   aiv) an air-fluid heat exchanger arranged downstream of an outlet of the at least one cooling flow pump, the air-fluid heat exchanger including a fan to cool cooling fluid passing through the heat exchanger;
   av) an outlet of the heat exchanger arranged to provide cooled fluid to one or more brakes of the axle assembly,
   avi) an inlet of the cooling fluid reservoir receiving cooling fluid from an outlet of the one or more brakes;
   the second subsystem including a cooling fluid powering circuit including:
   bi) at least one transmission pump coupled to the axle assembly, rotation of the axle of the axle assembly driving the at least one transmission pump and pumping a fluid through the cooling fluid powering circuit;
   bii) a variable speed cooling flow pump motor arranged downstream of the at least transmission pump, the variable speed cooling flow pump motor powered by the outlet flow from the at least transmission pump and designed to drive the at least one cooling fluid pump,
   biii) a variable speed fan motor arranged downstream of the at least one transmission pump, the variable speed fan motor powered by the outlet flow from the at least one transmission pump and designed to drive the fan of the heat exchanger;
   biv) a transmission reservoir arranged downstream of the variable speed cooling flow pump and fan motors;
   bv) optionally, at least one filter arranged upstream of the transmission reservoir to filter output from the variable speed cooling flow pump and fan motors,
   bvi) wherein outlet flow from the variable speed cooling flow pump and fan motors is directed back to the at least one transmission pump via a transmission reservoir to continually power the variable speed cooling flow pump and fan motors; and
   c) means for controlling the speed of the variable speed cooling flow pump and fan motors based on at least temperature of the brakes and one or more of fan fluid pressure, fan fluid temperature, fan speed, pressure at an inlet to the brakes, and pressure at an inlet to the heat exchanger, changing the speed of the variable speed cooling flow pump motor changing the flow of cooling fluid through the heat exchanger and brakes for brake cooling control and changing the speed of the variable speed fan motor allowing for control of heat exchange with the cooling fluid.

2. The system of claim 1, wherein two transmission pumps are provided, one transmission pump driving the variable speed cooling flow pump motor and the other transmission pump driving the variable speed fan motor.

3. The system of claim 2, wherein each transmission pump includes the at least one filter arranged upstream thereof.

4. The system of claim 1, wherein two cooling flow pumps are provided, one cooling flow pump for cooling one of the brakes of the axle assembly and the other cooling flow pump for cooling the other of the brakes of the axle assembly.

5. The system of claim 4, wherein each of the two cooling flow pumps includes the filter arranged downstream thereof.

6. The system of claim 1, wherein the mean for controlling includes a first controller for control of the variable speed cooling flow pump motor and a second controller for control of the variable speed fan motor.

7. The system of claim 6, wherein the first controller receives input as brake temperature and brake and heat exchanger inlet pressures for control of the variable speed cooling flow pump motor.

8. The system of claim 6, wherein the second controller receives input as fan fluid temperature, fan speed, and fan fluid pressure for control of the variable speed fan motor.

9. In a method of cooling brakes in an axle assembly, the improvement comprising providing the brake cooling system of claim 1 for brake cooling.

10. In a trailer having an axle assembly supporting rear wheels thereof, the axle assembly including brakes for the wheels, the improvement comprising using the system of claim 1 as a brake cooling system for the brakes of the axle assembly.

11. The trailer of claim 10, wherein the trailer is a lowboy trailer having a front-end hitch capable of connecting to a removable gooseneck hitch of a towing vehicle.

12. A braking cooling assembly comprising an axle assembly and the brake cooling system of claim 1.

13. In an axle assembly having brakes that require cooling, the improvement comprising at least one cooling flow pump that supplies cooling fluid to the brakes and means for driving of the cooling flow pump using rotation of a component of the axle assembly and a variable speed cooling flow pump motor, and a heat exchanger adapted to receive heated fluid from the brakes for cooling and recirculation back to the brakes.

14. The axle assembly of claim 13, wherein the heat exchanger includes a fan and a means for driving the fan using rotation of a component of the axle assembly and a variable speed fan motor.

\* \* \* \* \*